April 25, 1933.      R. K. LEE      1,905,475
VIBRATION DAMPER
Filed Feb. 1, 1930
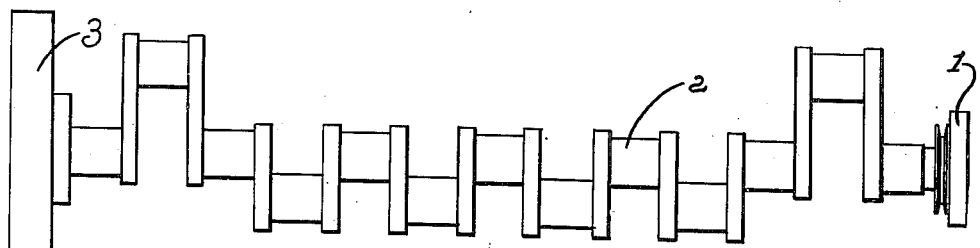
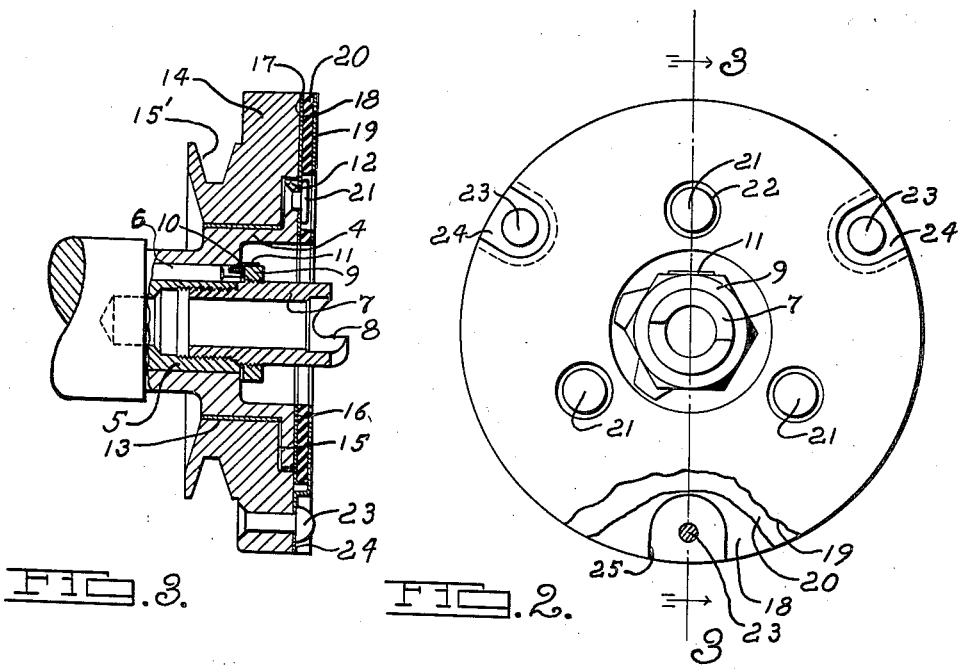
INVENTOR
BY   ROGER K. LEE.
ATTORNEY Patented Apr. 25, 1933

1,905,475

UNITED STATES PATENT OFFICE

ROGER K. LEE, OF HIGHLAND PARK, MICHIGAN, ASSIGNOR TO CHRYSLER CORPORATION, OF DETROIT, MICHIGAN, A CORPORATION OF DELAWARE

VIBRATION DAMPER

Application filed February 1, 1930. Serial No. 425,312.

This invention relates to vibration dampers for internal combustion engine crank shafts.

The main objects of this invention are to provide an improved means for securing a vibration damper to the crank shaft of an internal combustion engine; to provide means of this kind which will permit the removal of the damper from a crank shaft independently with respect to the crank socket thereof; to provide an improved yieldable connection between a crank shaft and the inertia member of the vibration damper; to provide a connection of this kind between adjacent surfaces of the relatively movable parts of a vibration damper which has substantially large bonded planular areas; to provide a vulcanized rubber connection between corresponding ends of the relatively movable elements of a vibration damper so as to obviate the increment of the diameter heretofore added to a device of this kind by forming a yieldable connection between the inner and outer peripheries of the movable elements.

An illustrative embodiment of my invention is shown in the accompanying drawing, in which:

Fig. 1 is a side elevation of a crank shaft having an improved damper thereon.

Fig. 2 is an end elevation of the damper shown in Fig. 1.

Fig. 3 is a vertical section taken on the line 3—3 of Fig. 2.

In the illustration shown, our improved vibration damper 1 is mounted on one end of a crank shaft 2 which has a fly wheel 3 on its other end.

The damper 1 comprises an inner member 4 mounted on a hollow extension 5 of the crank shaft 1 which has a reduced diameter. The extension 5 and the inner member 4 have registering slots in which a key 6 is located for rotating the inner member in unison with the crank shaft.

Threaded in the hollow extension 5 is a crank socket 7 having a crank jaw 8 on its outer end. A nut 9 is provided on the outer periphery of the socket 7 for securing the inner mmeber 4 against axial movement relative to the shaft 2. The nut 9 is preferably locked in a tightened position by a lock washer 10 which has upturned lugs 11 bearing against the nut 9.

Formed on the outer periphery of the inner member 4 is a flange 12 against which a bearing sleeve 13 is located. An outer inertia member 14 having a groove 15' therein for receiving a fan belt, is journaled on the sleeve 13. The inner member 4 and the outer member 14 are concentrically mounted on the shaft and the outer member 14 is provided with a recess 15 for receiving the flange 12 of the inner member 4 so as to position the extremities 16 and 17 of the inner and outer members 4 and 14 respectively, substantially in the same vertical plane.

The end 16 of the inner member 4 is yieldably connected with the end 17 of the inertia member 14 by a connecting unit which comprises a pair of spaced discs 18 and 19 having a rubber member 20 bonded by vulcanization to their adjacent surfaces. A plurality of rivets 21 rigidly secure the inner disc 18 to the flange 12 of the inner member 4. The peened ends of the rivets 21 are located in alignment with apertures 22 formed in the outer disc 19 and extending through the rubber member 20. The outer disc 19 is secured directly to the inertia member 14 by a plurality of rivets 23 which extend through apertures formed in spaced depressed parts 24 of the outer disc. Notches 25 are provided in the inner disc 18 in registration with the depressed parts 24 of the outer disc so as to permit these parts to be held in engagement with the end 17 of the inertia member 14.

In operation, the rubber connection between the relatively movable parts of the device permits the inertia ring 14 to lag momentarily when the speed of rotation of the crank shaft is increased and to momentarily exceed the speed of rotation of the crank shaft when rotation of the latter is decreased. This action causes the intensity of the vibrations which are normally created by variations of the speed of rotation of the crank shaft to be materially reduced.

With the above construction, a rubber connection having substantially large bonded areas is provided between the relatively movable parts of the vibration damper. By providing this connection between corresponding extremities of the members, the length and diameter of the device are confined to suitable dimensions. The entire vibration damper may be removed as a unit from the shaft 2 without requiring the removal of the crank socket 7 by unscrewing the nut 9.

Although but one specific embodiment of this invention has herein been shown and described, it will be understood that various changes including the size, shape and arrangement of parts, may be made without departing from the spirit of my invention and it is not my intention to limit its scope other than by the terms of the appended claims.

I claim:

1. A vibration damper comprising an inner member, an outer member journaled on said inner member, a plate secured to one extremity of said inner member, a second plate secured to the corresponding end of said outer member, and yieldable means between said plates and secured independently to each of said plates.

2. A vibration damper comprising an inner member, an outer member journaled on said inner member, and a yieldable connecting unit having inseparable parts comprising a pair of spaced plates having a vulcanized rubber bond therebetween, one of said plates being secured to an extremity of said inner member and the other plate being secured to an extremity of the outer member.

3. A vibration damper comprising a pair of relatively movable concentric members, a connecting unit consisting of inseparable parts and having an inner element secured to said inner member and an outer element secured to said outer member and having a rubber member between said elements and secured to the adjacent surfaces thereof.

4. A vibration damper comprising a pair of relatively movable concentric members, a disc secured to the inner member of said pair overlapping the outer member thereof and having spaced apertures therein, a second disc in spaced relation to said first disc having depressions in registration with the apertures of said first disc and engaging said outer member, rivets securing said depressed portions to said outer member, and a yieldable connection between said discs.

5. A vibration damper comprising a pair of relatively movable concentric members, a disc secured to the inner member of said pair overlapping the outer member thereof and having spaced apertures therein, a second disc in spaced relation to said first disc having depressions in registration with the apertures of said first disc and engaging said outer member, rivets securing said depressed portions to said outer member, and a rubber member located between said discs and vulcanized to the adjacent surfaces thereof.

6. The combination with a crank shaft, of a vibration damper comprising a pair of relatively movable members, one rigid with said crank shaft and the other having a fan belt groove therein, and a unitary yieldable connecting member having inseparable parts and including a pair of yieldably joined plates, each adapted for attachment to one of said rotatable members, respectively.

7. A vibration damper comprising a pair of relatively movable members, a connecting unit having inseparable parts and comprising a pair of spaced plates, an intermediate yieldable rubber element located between said plates and secured independently thereto, and means rigidly connecting each member to a different plate of said pair, said means being located within the perimeter of said plates.

8. A vibration damper including a pair of relatively movable concentric members having corresponding extremities in close proximity to each other, a pair of spaced discs adjacent the corresponding extremities of said members, each independently fixed rigidly to a different one of said members and a yieldable connection between said discs.

9. In combination a shaft, a vibration damper including an inertia member and means for connecting it with the shaft, said means embodying a pair of plate-like members having opposite faces extending radially of the shaft, one of said members being non-rotatably connected with the shaft and the other being secured to the inertia member, and a yieldable material positioned between the opposing faces of said members and forming a driving connection between them.

ROGER K. LEE.